United States Patent [19]

Arwidsson et al.

[11] Patent Number: 4,601,480
[45] Date of Patent: Jul. 22, 1986

[54] TRUCK

[75] Inventors: Lars I. Arwidsson, Västra Frölunda; Lennart E. R. Dahlander, Gråbo, both of Sweden

[73] Assignee: Idux Industriell Exploatering AB, Sweden

[21] Appl. No.: 709,687

[22] PCT Filed: Jun. 19, 1984

[86] PCT No.: PCT/SE84/00230
§ 371 Date: Feb. 19, 1985
§ 102(e) Date: Feb. 19, 1985

[87] PCT Pub. No.: WO85/00158
PCT Pub. Date: Jan. 17, 1985

[30] Foreign Application Priority Data

Jun. 20, 1983 [SE] Sweden ................................ 8303519

[51] Int. Cl.⁴ .............................................. B60P 1/04
[52] U.S. Cl. .................................. 280/43.12; 414/469
[58] Field of Search .................... 254/10 C; 280/43.12, 280/43.13, 43.23; 414/469

[56] References Cited

U.S. PATENT DOCUMENTS

| | | | |
|---|---|---|---|
| 2,197,926 | 4/1940 | Dunham | 254/10 C |
| 3,392,858 | 7/1968 | Fernstrom et al. | 280/43.12 X |
| 3,441,287 | 4/1969 | Leonard et al. | 280/43.12 |
| 3,601,423 | 8/1971 | Goodacre | 280/43.12 |
| 4,221,526 | 9/1980 | Crandall | 280/43.12 X |

FOREIGN PATENT DOCUMENTS 535702  5/1973  Switzerland .

Primary Examiner—John J. Love
Assistant Examiner—Michael Mar
Attorney, Agent, or Firm—Harness, Dickey & Pierce

[57] ABSTRACT

A truck designed to handle loads. The truck comprises a truck body which is movable by means of driving wheels. The truck body may be raised and lowered relative to the driving wheels, both in order to compensate for differences in levels between the loading bridge and the loading platform on a lorry and in order to compensate for any inclination of the lorry loading platform. The truck is provided with one or several lifting forks to handle loading pallets. The forks are comparatively long and are provided at their front ends with steerable support wheels which are also arranged to be operated for raising and lowering movements.

5 Claims, 6 Drawing Figures

TRUCK

BACKGROUND OF THE INVENTION

The subject invention concerns a truck which is adapted to handle loading pallets with the aid of fork-shaped lifting arms which are provided with vertically movable support wheels and with driving wheels arranged to pivot to steer the truck. Within the scope of the invention, the truck claimed herein may be designed as a guided truck in which case it is operated by a person walking beside the truck, it may be used as a driver-operated truck, the driver either sitting or standing on the truck, or it may be designed as an automatically guided truck, such as a loop-operated truck.

Prior-art trucks are primarily constructed to lift and transport one or two loading pallets (usually so called EUR-pallets) on a flat ground or support. However often the ideally flat-level conditions do not exist. For instance, it is often desired to use trucks to lift pallets on and off lorry loading-platforms. In order to lift off the pallets, the truck is driven onto the lorry loading-platform from a loading bridge or the like. To span the loading bridge and the loading platform a sloping drive-on ramp usually has to be employed, since the loading-platform and the loading bridge rarely are on the same level. When a conventional truck is driven onto a sloping ramp of this kind its lifting forks will be tilted upwards (or downwards) relative to the lorry loading-platform and consequently it presents considerable difficulties and may even be impossible to insert the lifting forks underneath the pallets as the spaces provided for this purpose are quite restricted vertically.

Loading of lorries by means of conventional trucks is also made additionally difficult in that lorry platforms seldom are horizontal but usually slope somewhat. This increases the difficulties of inserting the lifting forks into the space underneath the loading pallets. One purpose of the subject invention is to provide a truck which is capable of operating on sloping grounds or levels.

A problem which is encountered when pallets are loaded onto lorry platforms from behind is the highly restricted space laterally on the platform. Obviously, it is an advantage if optimum use can be made of this space. When loads are deposited on or lifted off platforms, precision in handling the pallets on the platform therefore is an important consideration. A problem arising in this connection is the risk of the occurrence of the phenomenon known as the sticking drawer effect, that is, the risk that when one operates in very narrow and restricted areas, one pallet, box or similar object will assume an oblique position relative to the rest and get stuck. To avoid this problem one of the purposes of the subject invention is to provide a truck which is capable of precision-handling loads, also in very restricted and narrow areas.

Trucks designed in accordance with conventional technology are normally equipped to handle one pallet of standard dimensions or possibly two such pallets stacked one on top of the other. This limits the capacity of prior-art trucks as well as entailing disadvantages of logistics which, taken together, in the case of a lorry and/or a trailer bring about comparatively lengthy loading-on and loading-off times as well as long truck operating times. Another purpose of the subject invention therefore is to provide a truck the capacity of which is greatly improved over that of prior-art trucks. The truck in accordance with the invention is designed to handle a large number of pallets of standard size (up to nine EUR pallets positioned side by side) or a smaller number of large-size pallets of a special design. The larger the individual pallet the larger the problems of steering and controlling the truck when it is to be driven onto and deposit its load on the loading platform.

SUMMARY OF THE INVENTION

To obtain the purposes outlined above the truck in accordance with the invention is characterized in that the driving wheels may be raised and lowered relative to the lifting forks, that the driving wheels and the support wheels are arranged to be raised and lowered independently of each other to operate the lifting forks to the desired angular position and that the support wheels are pivotable in a controlled manner. Owing to this arrangement the truck in accordance with the invention may be used for transports over sloping surfaces, such as ramps, etcetera.

A further characteristic of the truck in accordance with the invention is that it is provided with more than one lifting fork.

Further characteristics of the invention will appear from the rest of the dependent claims.

BRIEF DESCRIPTION OF THE DRAWINGS

The invention will be described in closer detail in the following with reference to the accompanying drawings, wherein.

DETAILED DESCRIPTION OF A PREFERRED EMBODIMENT

Figure 1:
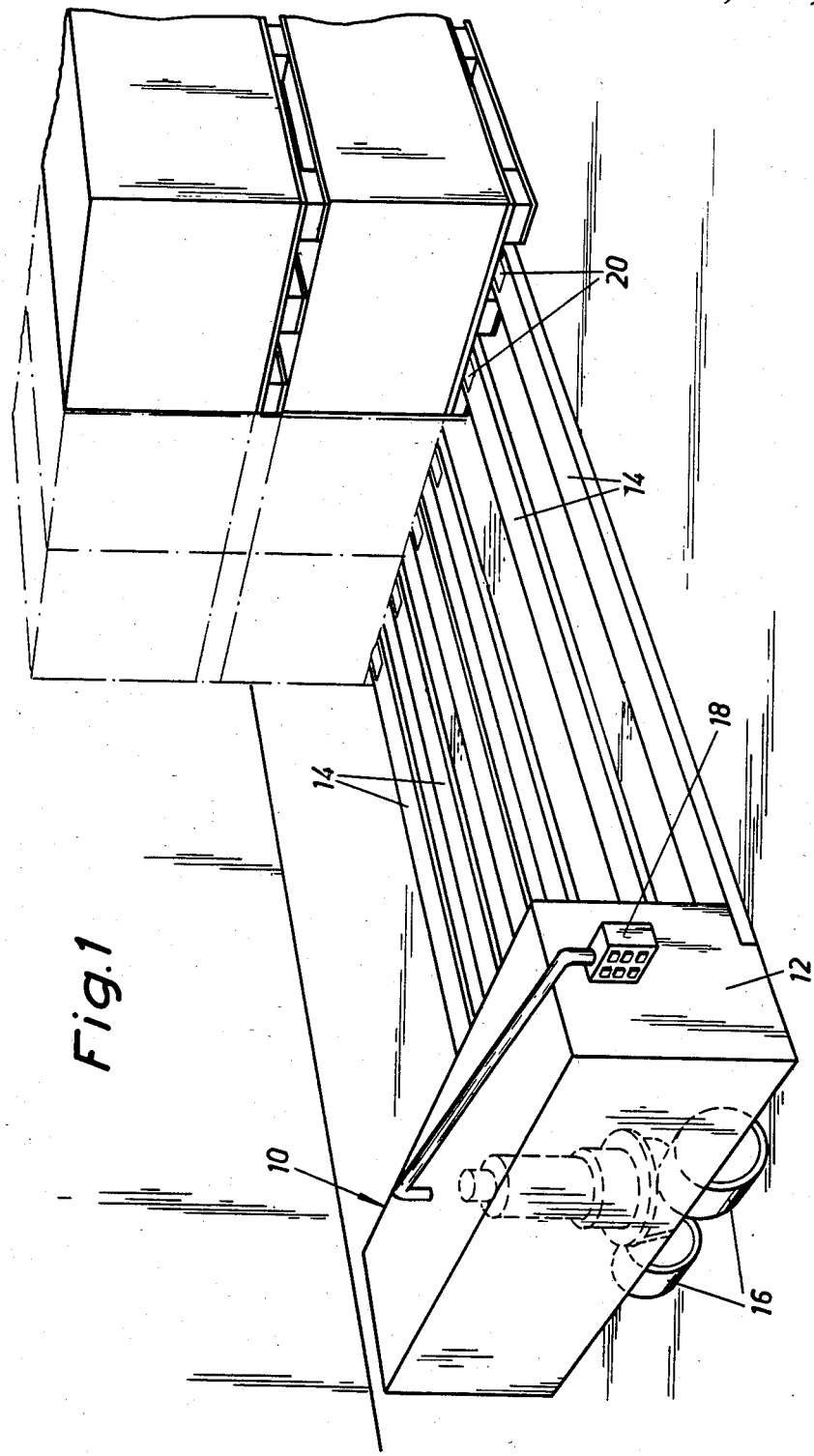
FIG. 1 is an overall perspective view of a truck in accordance with the invention.

The invention concerns a truck, generally designated by 10 and comprising a truck body or main part 12 and lifting forks 14 projecting therefrom. In accordance with the embodiment illustrated in the drawings the truck is equipped with six lifting fork arms. The truck 10 comprises driving wheels 16 the steering movements of which are controllable in a manner known per se. The truck 10 illustrated in the drawings is a guided truck, that is, it is operated by an operator walking beside the truck. The truck is provided with operating means 18.

Figure 2:
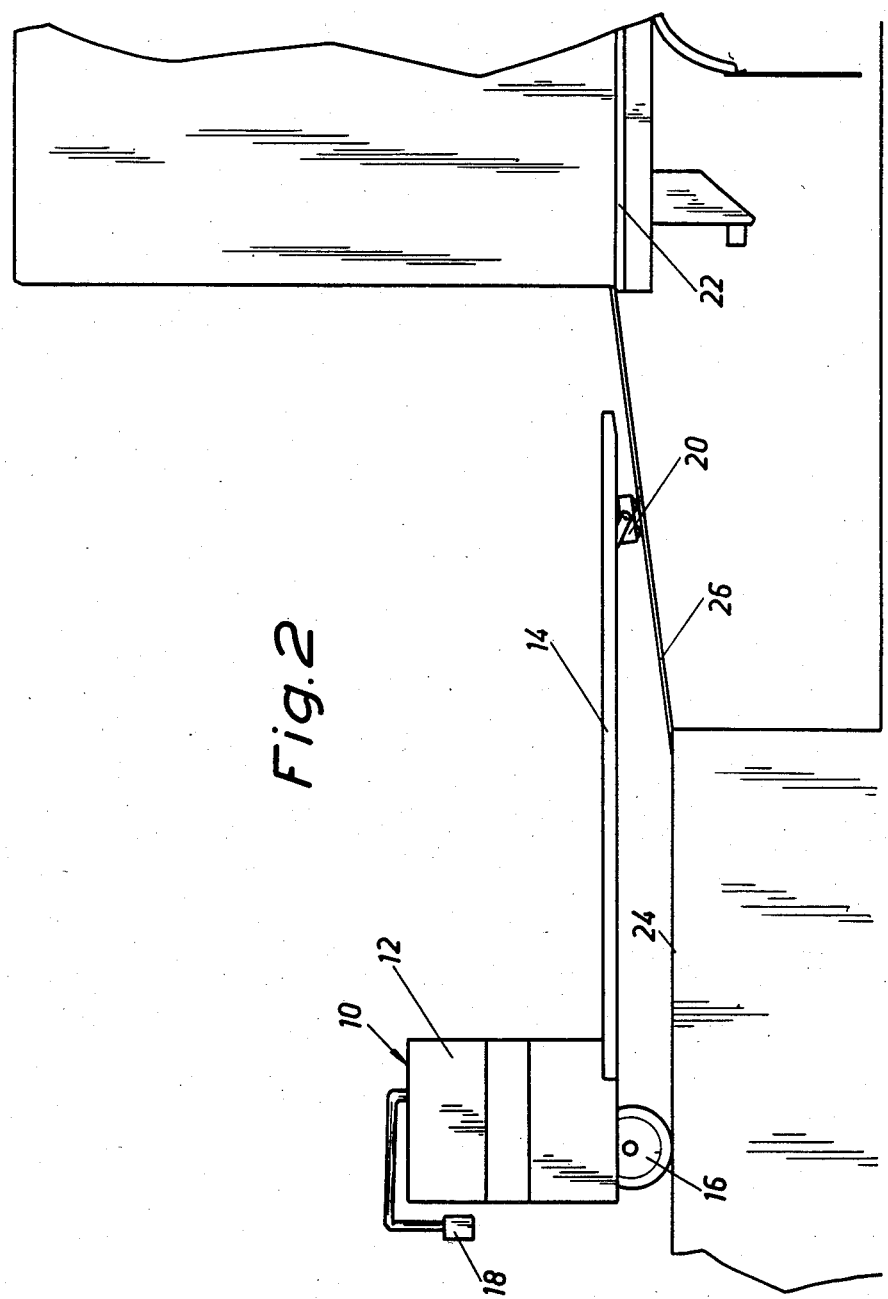
FIG. 2 is a lateral view of the truck in accordance with the invention when being driven onto a drive-on ramp.
Figure 3:
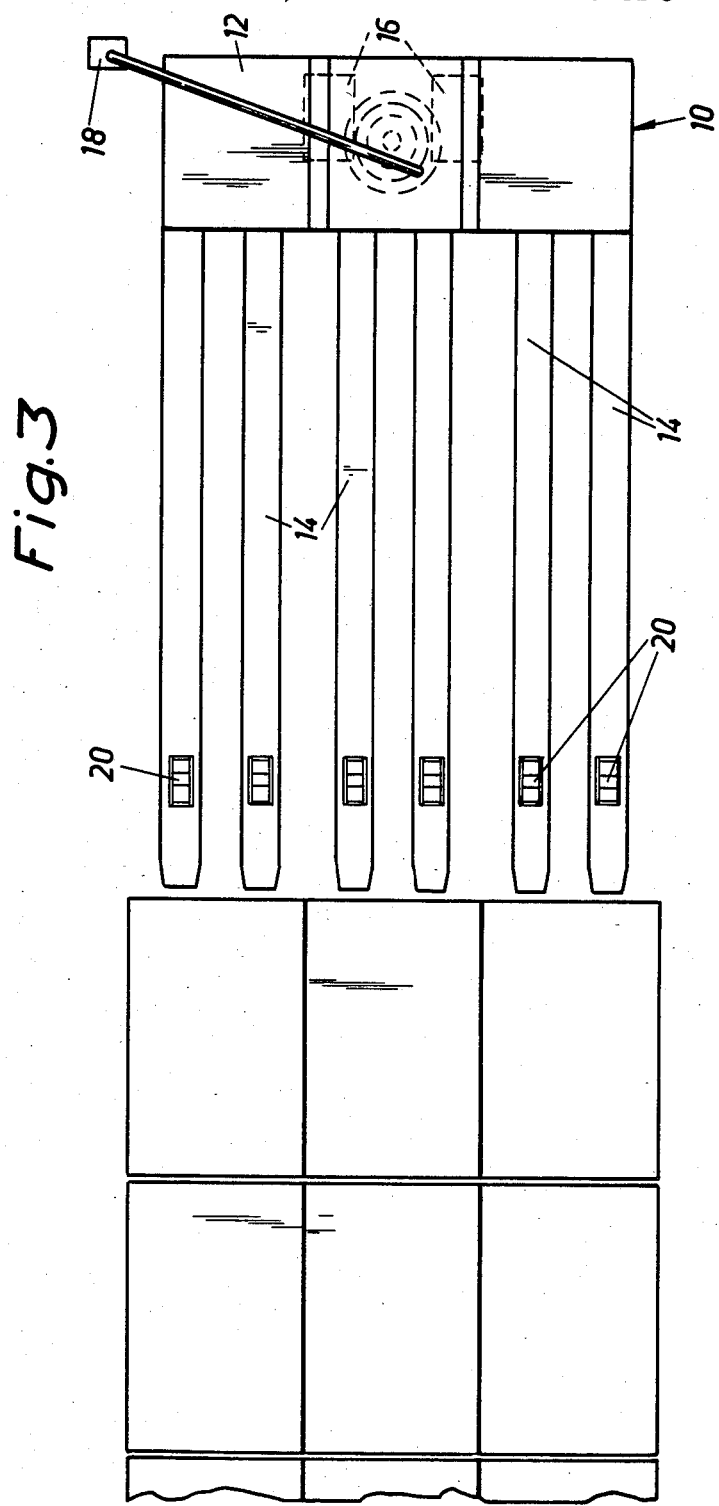
FIG. 3 is a plan view of the truck before insertion of the lifting forks underneath the loading pallets.
Figure 4:
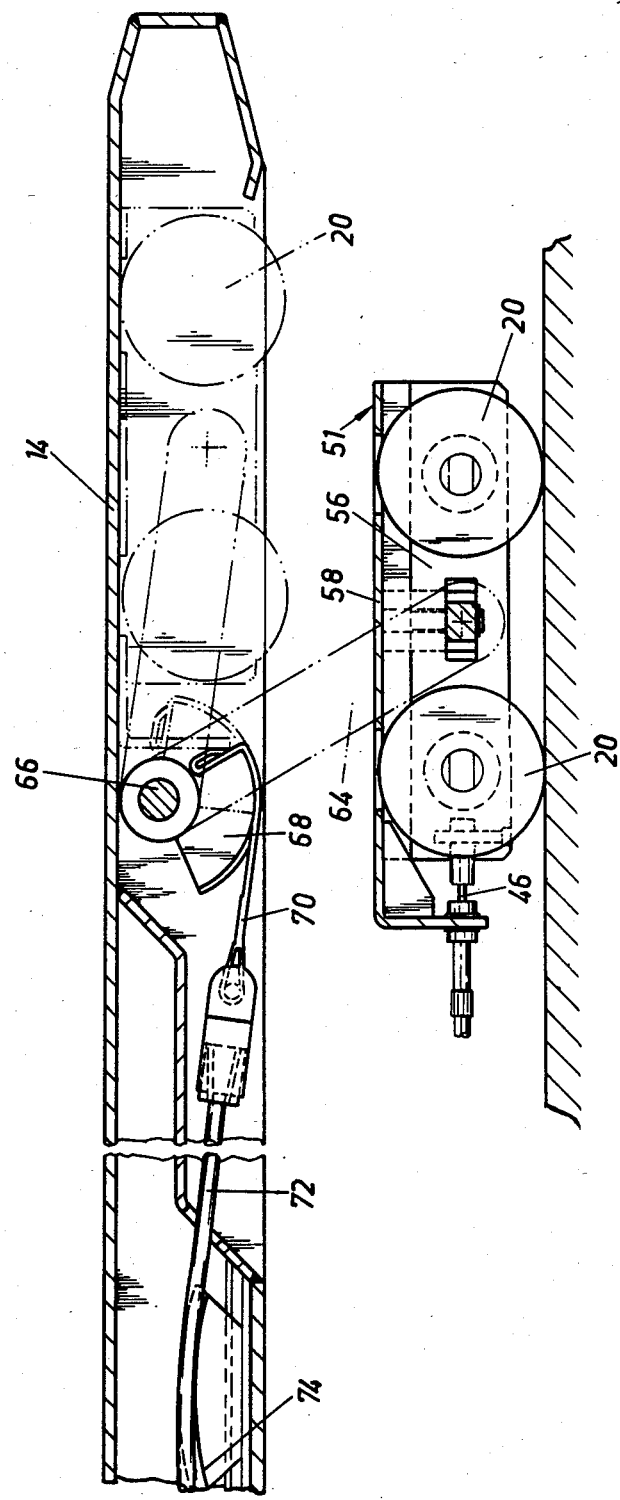
FIG. 4 is a cross-sectional view from the side of an embodiment of the support wheels provided on the truck lifting forks.
Figure 5:
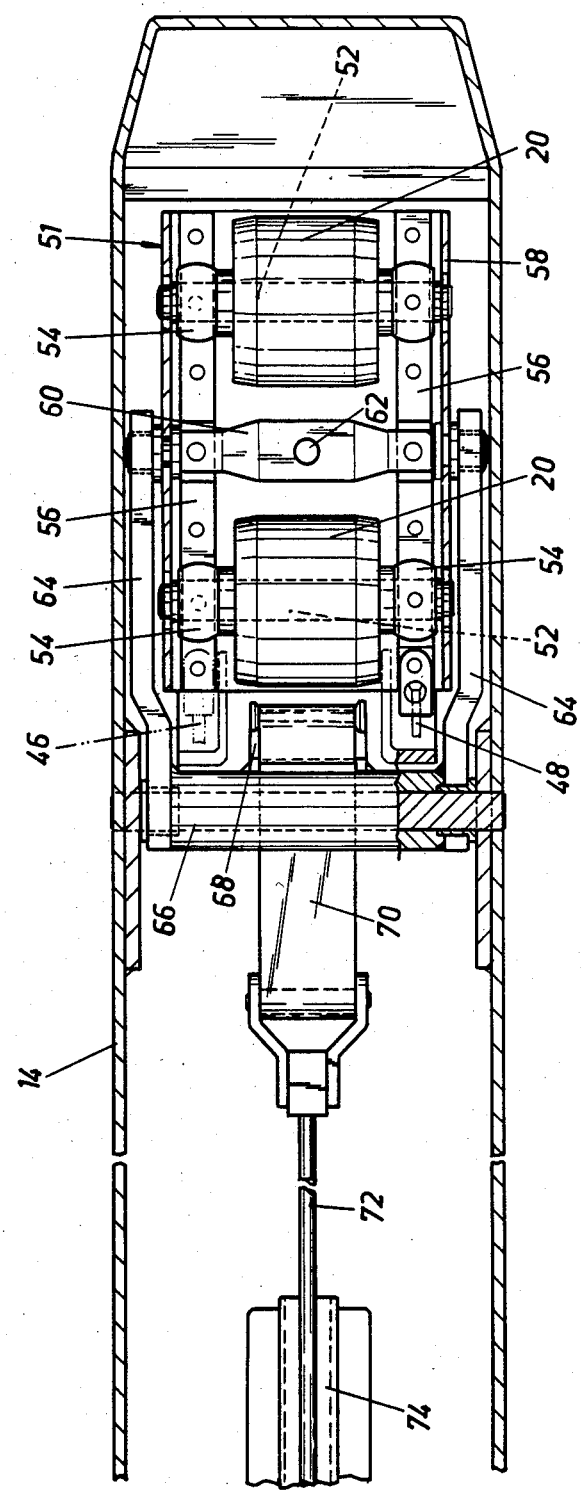
FIG. 5 is a partly broken plan view of the embodiment of the support wheels illustrated in FIG. 4.
Figure 6:
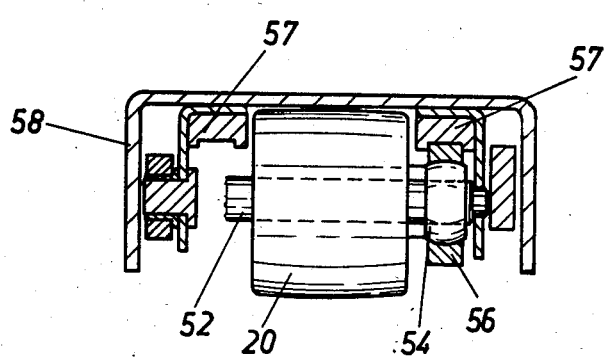
FIG. 6 is a detailed view of the mounting of the support wheels.

FIG. 2 shows the provision at the front end of the lifting forks 14 of support wheels 20. The latter may be raised and lowered relative to the lifting forks 14. The suspension and function of the support wheels 20 is shown in FIGS. 4, 5 and 6 by way of example. FIG. 2 also illustrates how the truck body 12 (and consequently also the lifting forks 14) may be raised and lowered relative to the driving wheels 16. This movement may be effected over one or a few decimeters. Conventional lifting carriages and guided trucks have a truck body which may be raised only one or a few centimeters to lift a load off the ground.

As illustrated in FIG. 2 the truck in accordance with the invention may be used to lift a load off lorry loading-platforms, such as shown at 22, in which case the truck 10 is to be driven onto the lorry on an access ramp 26. The ramp will slope since the platform 22 and the loading bridge 24 are at different levels, which ususally is the case. The feature of allowing raising and lowering is, as mentioned in the aforegoing, an important ability in the truck in accordance with the invention and the consequences of this ability are that it becomes possible to maintain the lifting forks 14 in parallel with the loading platform when the truck is driven onto the latter, allowing easy insertion of the forks underneath the loading pallets, also when the lorry loading platform is not quite horizontal.

The lowering and raising feature of the truck is obtained by means of a hydraulic system indicated in FIG. 1 and comprising a conventional piston-and-cylinder unit. The drawing figure does not show the mechanism of obtaining the pivotability of the wheels 16 since mechanisms for this purpose belong to the prior-art and a number of constructional solutions are feasible.

FIGS. 4 and 5 illustrate a preferred embodiment of arranging the support wheels 20 to allow them to perform pivotal movements independently of each other.

The support wheels 20 are positioned in a bogie 51 and are mounted on shafts 52 by means of ball bearings. Two wires 46, 48 are provided to effect the pivotal movements of the support wheels 20. The ends of the shafts 52 are journalled in spherical sleeves 54 which are mounted in seats in steering guides 56. The load to be supported by the support wheels 20 is taken by the steering guides 56 by means of friction bodies 57 provided on the guides 56. The frame 58 of the bogie 51 is supported by the friction bodies 57. The steering guides 56 are positioned on either side of the wheels 20 and are interconnected by a link arm 60. The arm is pivotably mounted at its centre to a shaft 62, the latter being attached to the upper wall of the frame 58 of the bogie 51.

When one of the steering guides 56 is moved by pulling one of the wires 46, 48 (resulting in the other one of the two wires being moved to a corresponding extent in the opposite direction) a relative displacement of the steering guides 56 occurs, owing to the link arm 60. This relative displacement results in an individual pivotal movement of the wheel shafts 52 and therefore of the wheels 20. The wheels turn about an imaginary normal axis at the centre of the face of abutment of the wheel against its support. As a result, the wheels 20, when turning, are imparted the smallest possible sliding motion against the support. The turning moment in steering operations becomes low. The friction bodies 57 are made from a low-friction material to facilitate the steering movements of the wheels 20.

The bogie 51 performs raising and lowering movements relative to the fork-lift arms 14 in the manner illustrated in FIG. 4. In this drawing figure dash-and-dot lines indicate the position of the bogie 51 when folded into the lifting fork 14 whereas the lower position of the bogie 51 for lifting the lifting fork 14 is shown in continuous lines. The bogie 51 may be raised and lowered by means of a fork-shaped lever 64 one end of which is secured to a shaft 66 while the opposite end is mounted to the frame 58. The shaft 66 is secured to the lifting fork 14 and supports a segment-shaped member 68 which is shaped to allow operation of the fork-shaped lever 64 by means of a strap 70. The strap 70 is in turn connected to a wire or a steel cable 72 which is carried over a saddle-shaped slide member 74. When the wire 72 is pulled the shaft 66 turns and the bogie 51 is lowered relative to the lifting fork 14. The configuration of the segment-shaped member 68 provides a constant radius of lever for the operation of the fork-shaped lever 64.

The means (such as hydraulic piston-and-cylinder units) by means of which the wires and steel cables 46, 48, 72 are operated, are positioned in the body 12 of the truck. This is convenient, since the space available underneath loading pallets is small.

All lifting forks 14 are provided with support wheels 20. It is possible to arrange for control of the steering movements of all support wheels and to coordinate the movement control of the wheels 20 so as to obtain identical wheel turning movements. Such coordination may be achieved by means of a piston system provided in the truck body 12. It is likewise possible to coordinate the steering movements of only some of the support wheels 20 while the rest of the wheels are allowed to turn freely (in a manner similar to the front wheels of shopping trolleys). The uncontrolled support wheels 20 will take part in the pivotal or turning movements. It is likewise possible to make all wheels pivotable without steering control of their pivotal movements. In the later case the truck body is arranged to be operated to perform sharp turns and it is provided with preferably more than two driving wheels. In this embodiment a moment is applied to the support wheels tending to turn the latter.

As a result of the turnability of the support wheels 20 the truck will be easy to operate as well as easy to drive and steer to insert its lifting forks 14 underneath loading pallets. Also when it is equipped with six lifting forks 14 there are no problems to guide the forks in underneath the pallets.

The lifting forks 14 have a length exceeding that usually found in conventional trucks. The increased number and the larger length of the forks multiply the capacity of the truck 10. A truck in accordance with the invention is capable of handling e.g. nine pallets of standard size (EUR pallets) positioned side by side (in three rows with three pallets in each row).

The embodiment of the invention described in the aforegoing and illustrated in the drawings is to be regarded as an example only and a number of different modifications are possible within the scope of the appended claims. A hydraulic mechanism may be used instead of the mechanical arrangement comprising wires to control the turning movements of the support wheels 20. The raising and lowering movements of the support wheels 20 may be effected by traction rods or by hydraulic devices instead of by means of wires.

The lifting forks 14 may be arranged to be lifted and lowered relative to the truck body 12 in which case the latter need not be vertically movable relative to the driving wheels 16.

What we claim is:

1. An improved truck designed to handle goods, said truck having a number of lifting forks, each fork being secured at one end to the body of said truck and at its opposite end to a vertically movable support wheel, and driving wheels arranged to pivot for supporting and steering said truck, the improvement comprising:

means for raising and lowering said truck relative to said driving wheels, bogie means mounted on the lower face of said lifting forks, said support wheels being arranged in said bogie means, operating means for raising and lowering said bogie means relative to said lifting forks, and steering control means for pivoting said support wheels, wherein said operating means and said steering control means are adapted to be operated independently of each other, and said truck body and said lifting forks are adapted to be raised and lowered independently of each other for adjusting the angular position of said lifting forks relative to said truck body.

2. An improved truck as claimed in claim 1, wherein each bogie means comprises at least two support wheels and guides within which said support wheels are mounted, said guides being arranged to effect the pivotal movement of said support wheels.

3. An improved truck as claimed in claim 1, wherein each bogie means comprises at least two support wheels and guides within which said support wheels are mounted, said guides being arranged to be displaced in a parallel relationship for pivoting said support wheels.

4. An improved truck as claimed in claim 1, wherein said steering control means includes wires extending within said lifting forks and arranged to be operated from the body of said truck.

5. An improved truck as claimed in claim 1, wherein said operating means for raising and lowering said bogie means comprises a lever, a shaft on which said lever is journalled, a segment-shaped member mounted on said shaft, and a tensile stress absorbing means attached to said segment-shaped member, said tensile stress absorbing means being arranged to pivot said segment-shaped member for turning said shaft in order to lower or raise said bogie means.

* * * * *